United States Patent
Pattan et al.

(10) Patent No.: US 9,264,260 B2
(45) Date of Patent: Feb. 16, 2016

(54) SYSTEM AND METHOD OF HANDLING READ AND DELIVERY CONFIRMATIONS FOR MESSAGES

(75) Inventors: Basavaraj Jayawant Pattan, Bangalore (IN); Mayuresh Madhukar Patil, Bangalore (IN); Venkateswar Jeedigunta, Bangalore (IN); Seung-yong Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 323 days.

(21) Appl. No.: 13/499,643

(22) PCT Filed: Sep. 30, 2010

(86) PCT No.: PCT/KR2010/006677
§ 371 (c)(1),
(2), (4) Date: Mar. 30, 2012

(87) PCT Pub. No.: WO2011/040774
PCT Pub. Date: Apr. 7, 2011

(65) Prior Publication Data
US 2012/0191799 A1      Jul. 26, 2012

(30) Foreign Application Priority Data
Sep. 30, 2009   (IN) .......................... 2382/CHE/2009

(51) Int. Cl.
G06F 15/16    (2006.01)
H04L 12/58    (2006.01)

(52) U.S. Cl.
CPC ............ *H04L 12/5885* (2013.01); *H04L 51/34* (2013.01)

(58) Field of Classification Search
USPC .................................................. 709/203–206
See application file for complete search history.

(56) References Cited

U.S. PATENT DOCUMENTS

| | | | |
|---|---|---|---|
| 7,165,089 B2 * | 1/2007 | Shimada ....................... | 709/203 |
| 8,225,000 B2 * | 7/2012 | Xu et al. ........................ | 709/248 |
| 2006/0123686 A1 | 6/2006 | Larue | |
| 2008/0114881 A1 | 5/2008 | Lee et al. | |
| 2009/0106455 A1 | 4/2009 | Xu et al. | |
| 2009/0213841 A1 | 8/2009 | Masson | |
| 2010/0185740 A1 * | 7/2010 | Lee et al. ....................... | 709/206 |
| 2010/0304766 A1 * | 12/2010 | Goyal ........................... | 455/466 |

OTHER PUBLICATIONS

International Search Report dated Jun. 23, 2011 in connection with International Patent Application No. PCT/KR2010/006677.
Written Opinion of International Searching Authority dated Jun. 23, 2011 in connection with International Patent Application No. PCT/KR2010/006677.

* cited by examiner

*Primary Examiner* — Michael Y Won
*Assistant Examiner* — Karina J Garcia-Ching (57) ABSTRACT

A system and method of managing read and delivery reports for messages is disclosed. In one embodiment, a method for generating a read report using an IMAP includes processing a message received from a first converged internet protocol messaging (CPM) client device, storing the processed message into a message storage server using an internet message access protocol (IMAP) protocol, generating a read report by the second CPM client device in response to displaying the processed message stored in the message storage server, and delivering the read report to the first CPM client device by a CPM participating/controlling function server. The method also includes blocking redundant delivery reports generated upon retrieval of the message.

20 Claims, 8 Drawing Sheets

SYSTEM AND METHOD OF HANDLING READ AND DELIVERY CONFIRMATIONS FOR MESSAGES

CROSS-REFERENCE TO RELATED APPLICATION(S)

The present application claims priority under 35 U.S.C. §365 to International Patent Application No. PCT/KR2010/006677 filed Sep. 30, 2010, entitled "SYSTEM AND METHOD OF HANDLING READ AND DELIVERY CONFIRMATIONS FOR MESSAGES". International Patent Application No. PCT/KR2010/006677 claims priority under 35 U.S.C. §365 and/or 35 U.S.C. §119(a) to Indian Patent Application No. 2382/CHE/2009 filed Sep. 30, 2009 and which are incorporated herein by reference into the present disclosure as if fully set forth herein.

TECHNICAL FIELD

The present invention relates to a field of communication and more particularly to handling read and delivery confirmations for messages.

BACKGROUND ART

A converged internet protocol messaging (CPM) architecture includes a CPM client device, a message storage client device, a message storage server (MSS), and a CPM participating/controlling function server. The CPM client device handles all real-time communication such as session based messaging, page mode messaging and user preference setting. The CPM server is an application server that maintains services such as one-one session, group session, page mode session, file transfer, and multi-device handling.

The message storage server stores CPM user level messages using an internet message access protocol (IMAP). The CPM participating/controlling function server stores the CPM user level messages into the message storage server based on instructions from the CPM users using the IMAP. The message storage client device manages the message storage server of the CPM user using the IMAP.

DISCLOSURE OF INVENTION

Summary

Typically, when a message is received from a CPM client device, the CPM participating/controlling function server converts the CPM message into an IMAP message and stores the IMAP message in the message storage server using the IMAP. The CPM participating/controlling function server stores the CPM message in the message storage server since a terminating CPM client device has requested the CPM participating/controlling function server to store messages in the message storage server and not to send directly. The originating CPM client device may request for a delivery report and a read report upon delivering the CPM message and reading the message by the terminating CPM client device. In such a case, the CPM participating/controlling function server sends a delivery report to the originating CPM client device. Currently, when the terminating CPM client device fetches the message stored in the message storage server using the IMAP and reads the message, a read report is not generated as the IMAP does not support a read report delivery to the originating CPM client device unlike session initiation protocol (SIP). Also, the CPM architecture enables multiple CPM client devices to fetch the same message from the message storage server. Thus, whenever, each device fetches the message, a delivery report is generated, resulting in multiple redundant delivery reports being sent to the originating CPM client device.

Solution to Problem

A system and method of handling read and delivery confirmations for messages is disclosed. In one aspect, a method for handling a read confirmation for a message includes processing a message received from a first converged internet protocol messaging (CPM) client device, and storing the processed message into a message storage server by a CPM participating/controlling function server using an internet message access protocol (IMAP). The method also includes generating a read report by the second CPM client device in response to displaying the processed message. The method further includes delivering the read report to the first CPM client device by the CPM participating/controlling function server.

In another aspect, a method for handling a delivery confirmation for a message includes processing a message received from a first CPM client device, and storing the processed message in a message storage server by a CPM participating/controlling function server using an IMAP. The method also includes generating a delivery report by a CPM participating/controlling function server upon storing the processed message. The method further includes blocking one or more subsequent delivery reports generated by one or more CPM client devices upon retrieving the stored message from the message storage server.

In yet another aspect, a system for handling read confirmation for a message includes CPM participating/controlling function server for processing a message received from at least one originating CPM client device, a message storage server for storing the processed message using an IMAP, and at least one terminating CPM client device for generating a read report in response to displaying the processed message stored in the message storage server.

In a further aspect, a system for handling a read confirmation for a message includes a CPM participating/controlling function server for processing a message received from at least one originating CPM client device, a message storage server for storing the processed message using an IMAP, and at least one terminating CPM client device for updating a read report status flag to the message storage server for generation of a read report by the CPM participating/controlling function server.

In further another aspect, a system for handling delivery confirmation for a message includes a CPM participating/controlling function server for processing a message received from at least one originating CPM client device, storing the processed message into a message storage server using an IMAP, and generating a delivery report upon storing the processed message. The system also includes at least one terminating CPM client device for blocking subsequent delivery reports generated upon retrieval of the stored message from the message storage server.

Other features of the embodiments will be apparent from the accompanying drawings and from the detailed description that follows.

Advantageous Effects of Invention

The present invention can handle read and deliver confirmations for messages.

The drawings described herein are for illustration purposes only and are not intended to limit the scope of the present disclosure in any way.

DETAILED DESCRIPTION OF THE PREFERRED EMBODIMENTS

A system and method of handling read and delivery confirmations for messages is disclosed. The following description is merely exemplary in nature and is not intended to limit the present disclosure, applications, or uses. It should be understood that throughout the drawings, corresponding reference numerals indicate like or corresponding parts and features.

Figure 1:
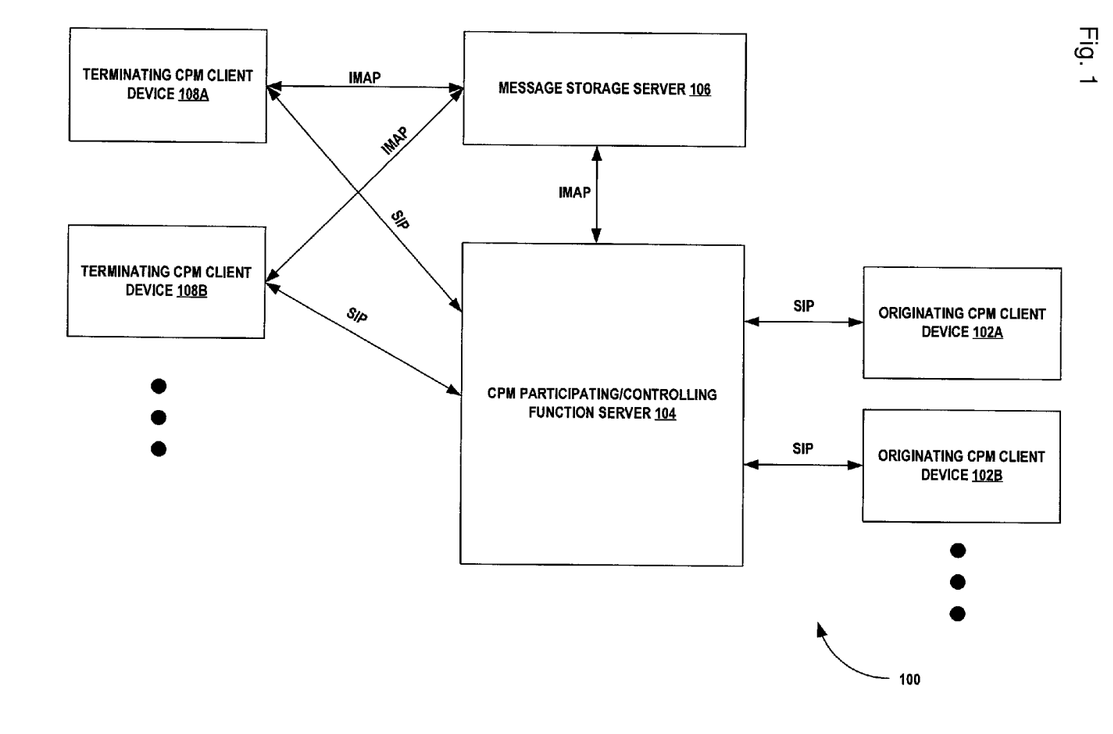
FIG. 1 illustrates a block diagram of converged internet protocol messaging (CPM) system capable of generating a read report and a deliver report in response to a CPM message, according to one embodiment.

FIG. 1 illustrates a block diagram of converged internet protocol messaging (CPM) system 100 capable of generating a read report and a deliver report in response to a CPM message, according to one embodiment. In FIG. 1, the CPM system 100 includes originating CPM client devices 102A-N, a CPM participating/controlling function server 104, a message storage server 106, and terminating CPM devices 108A-N.

In some embodiments, the CPM system 100 enables generation and delivery of a read report upon retrieving a CPM message stored in the message storage server 106. A CPM message is information that is sent to one or more CPM client devices as a standalone entity which can contain several discrete media. Examples of CPM message include pager mode message (message sent without establishing a session), large mode message (single message sent via MSRP), chat messages, file transfers, and the like. In these embodiments, the CPM system 100 generates a read report for the first time and blocks subsequent read requests generated by one or more terminating client devices 108A-N upon retrieval of the CPM message. Also, the CPM system 100 provides a delivery report to one of the originating CPM client devices 102A-N after storing the CPM message in the message storage server 106. However, the CPM system 100 blocks a delivery report generated upon retrieval by any of the terminating CPM devices 108A-N.

For the purpose of illustration, consider that, the originating CPM client device 102A sends a CPM message destined to a terminating CPM client device 108A using a session initiation protocol (SIP). Also, consider that, the originating CPM client device 102A has requested for a read report in response to display of the CPM message to the terminating CPM client device 108A. Further, consider that the terminating CPM client device 108A has requested the CPM participating/controlling function server 104 to store any CPM message received from any of the originating CPM client devices 102A-N in the message storage server 106.

According to an embodiment of the present invention, when the CPM participating/controlling function server 104 receives the CPM message from the originating CPM client device 102A, the CPM participating/controlling function server 104 converts the CPM message into an IMAP message. In one exemplary implementation, the CPM participating/controlling function server 104 inserts IMDN headers in the IMAP message. This is when the terminating CPM client device 108A has to generate the read report. Further, the CPM participating/controlling function server 104 stores the IMAP message containing the IMDN headers into the message storage server 106 using an IMAP. The message client (not shown) in the terminating CPM client device 108A retrieves the IMAP message from the message storage server 106 using the IMAP. Accordingly, the IMAP message is displayed on the display of the terminating CPM client device 108A.

As a result, the terminating CPM client device 108A generates a read report in response to displaying of the IMAP message. Further, the terminating CPM client device 108A updates the read report status flag to true ("\read-report-sent") in the message storage server 106. The definition of new flag "\read-report-sent" updated in the message storage server is a CPM-defined IMAP flag extension associated with the IMAP message stored in the message storage server 106. The formal syntax of \read-report-sent is: flag-extension="\read-report-sent, for example, C: A003 STORE 2:4+FLAGS (\read-report-sent). The "\read-report-sent" status flag is visible to the message storage client and is masked to the user of the terminating devices 102A-N. It is appreciated that, the message storage client in the terminating CPM client device 108B and the message storage server 106 supports metadata flag "\read-report-sent".

The report status flag is also updated in the message storage server 106 in case where the CPM message is received by the terminating CPM client device 102A using the SIP and the read report is generated by the terminating CPM client device 108B. Upon generation of the read report, the terminating CPM client device 108B updates a read report status flag to true ("\read-report-sent") in the IMAP message stored in the message storage server 106. Further, whenever the terminating CPM client device 108A retrieves the IMAP message from the message storage server 106, the terminating CPM client device 108A reads the IMDN headers including the updated read report status flag "\read-report-sent", thereby not generating duplicate read report.

The read report status flag is used to record whether a read report has been sent for the IMAP message in the message storage server 106. The read report status flag helps prevent generation of read reports when the same CPM message is retrieved by any of the terminating client devices 108A-N for subsequent number of times. The terminating CPM client device 108A sends the generated read report to the CPM participating/controlling function server 104 using the SIP.

Accordingly, the CPM participating/controlling function server 104 delivers the read report to the originating CPM client device 102A.

In alternate exemplary implementation, the CPM participating/controlling function server 104 removes IMDN headers from the IMAP message and stores the IMAP message in the message storage server 106 using the IMAP. This is when the CPM participating/controlling function server 104 generates the read report in response to display of the CPM message on the terminating CPM client device 108A. Further, the message client in the terminating CPM client device 108A fetches the CPM message from the message storage server 106 using the IMAP. Accordingly, the IMAP message is displayed on the display of the terminating CPM client device 108A.

Further, the terminating CPM client device 108A updates the read report status flag to true. This helps prevent another terminating CPM client device 108B to generate a read report when the same CPM message is retrieved for subsequent number of times. The terminating CPM client device 108A sends the updated read report status flag (\read-report-sent") to the message storage server 106 using the IMAP. The message storage server 106 sends the updated read report status flag to the CPM participating/controlling function server 104 using the IMAP.

Accordingly, the CPM participating/controlling function server 104 generates and delivers a read report to the originating CPM client device 102A based on the updated read report status flag using the SIP. In order to continuously receive updates from the message storage server 106, the CPM participating/controlling function server 104 maintains an active session with the message storage server 106 using the IMAP idle command. Alternatively, the CPM participating/controlling function server 104 can poll the message storage server 106 periodically to receive the updated read report status flag.

In another scenario, consider that the originating CPM client device 102A sends a CPM message destined to the terminating CPM client device 108A using the SIP. Also, consider that the originating CPM client device 102A has requested for a delivery report in response to delivery of the CPM message to the terminating CPM client device 108A. Further, consider that the terminating CPM client device 108A has requested the CPM participating/controlling function server 104 to store any CPM message received from any of the originating CPM client devices 102A-N in the message storage server 106.

According to an embodiment of the present invention, when the CPM participating/controlling function server 104 receives the CPM message from the originating CPM client device 102A, the CPM participating/controlling function server 104 converts the CPM message into an IMAP message. The CPM participating/controlling function server 104 inserts IMDN headers in the IMAP message and updates the IMDN headers to indicate that the delivery report is handled. Further, the CPM participating/controlling function server 104 stores the IMAP message containing the IMDN headers into the message storage server 106 using the IMAP. The CPM participating/controlling function server 104 then sends a delivery report to the originating CPM client device 102A.

The message client (not shown) in the terminating CPM client device 108A retrieves the IMAP message from the message storage server 106 using the IMAP. Accordingly, the IMAP message is displayed on the display of the terminating CPM client device 108A. The terminating CPM client device 108A reads the IMDN headers inside the IMAP message and blocks generation of the delivery report upon retrieval of the IMAP message. The embodiments of the present invention as discussed in FIG. 1 are described in greater detail in FIGS. 2 through 5.

Figure 2A:
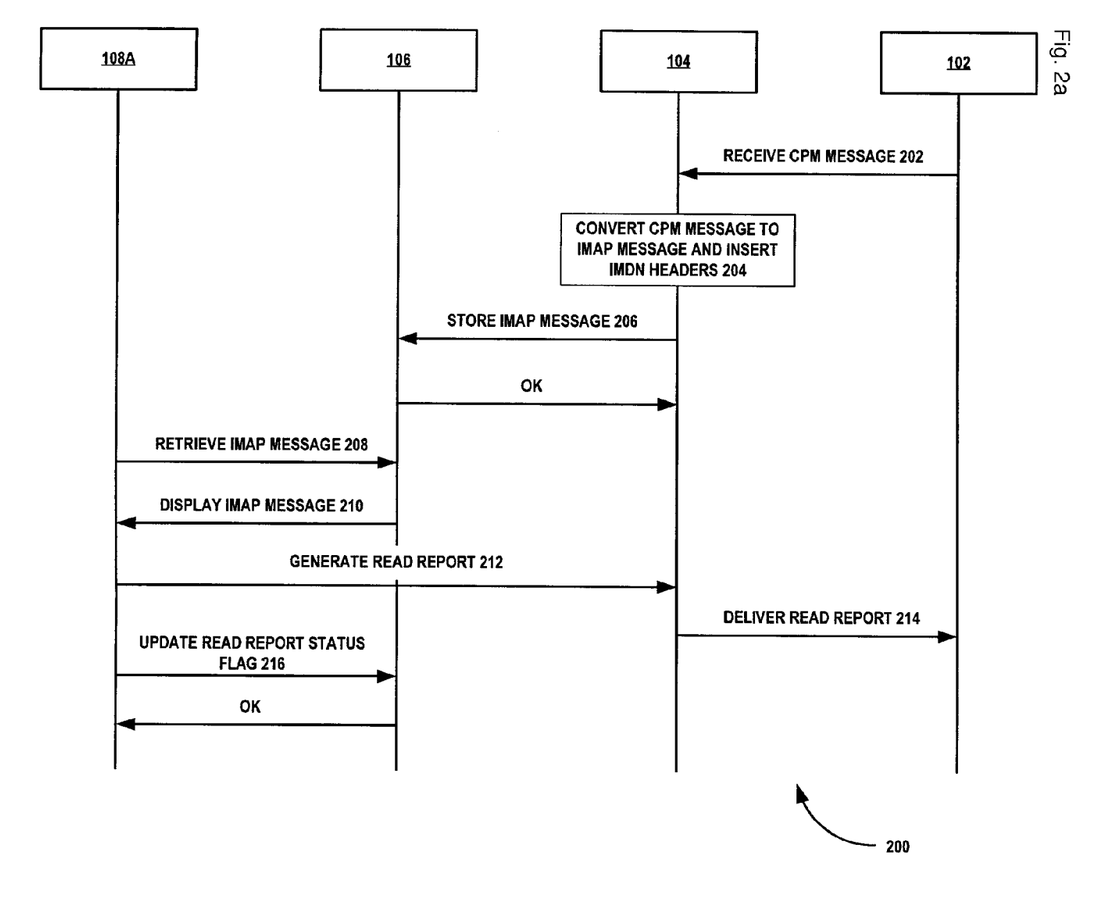
FIG. 2a is a flow diagram illustrating generation of a read report by a terminating CPM client device, according to one embodiment.

FIG. 2a is a flow diagram 200 illustrating generation of a read report by the terminating CPM client device 108A, according to one embodiment. At step 202, a CPM message is received from the originating CPM client device 102A by the CPM participating/controlling function server 104. At step 204, the CPM message is converted into an IMAP message and IMDN headers are inserted into the IMAP message. At step 206, the IMAP message is stored in the message storage server 106 by the CPM participating/controlling function server 104 using an IMAP. At step 208, the IMAP message is retrieved from the message storage server 106 by the terminating CPM client device 108A using the IMAP. At step 210, the IMAP message is displayed on the terminating CPM client device 108A. Upon displaying, it is determined whether a read report status flag in the IMDN headers is set to false. If the read report status flag is set to false, then a read report is generated by the terminating CPM client device 108A using an IMDN, at step 212.

Further, at step 212, the generated read report is sent to the CPM participating/controlling function server 104 by the terminating CPM client device 108A using the SIP. At step 214, the read report is delivered to the originating CPM client device 102A by the CPM participating/controlling function server 104 using the SIP. At step 216, the read report status flag in the IMDN headers is set to true by the terminating CPM client device 108A which is then updated in the message storage server 106. This helps prevent another terminating CPM client devices 108B-N to generate duplicate read reports during subsequent retrievals of the IMAP message.

Figure 2B:
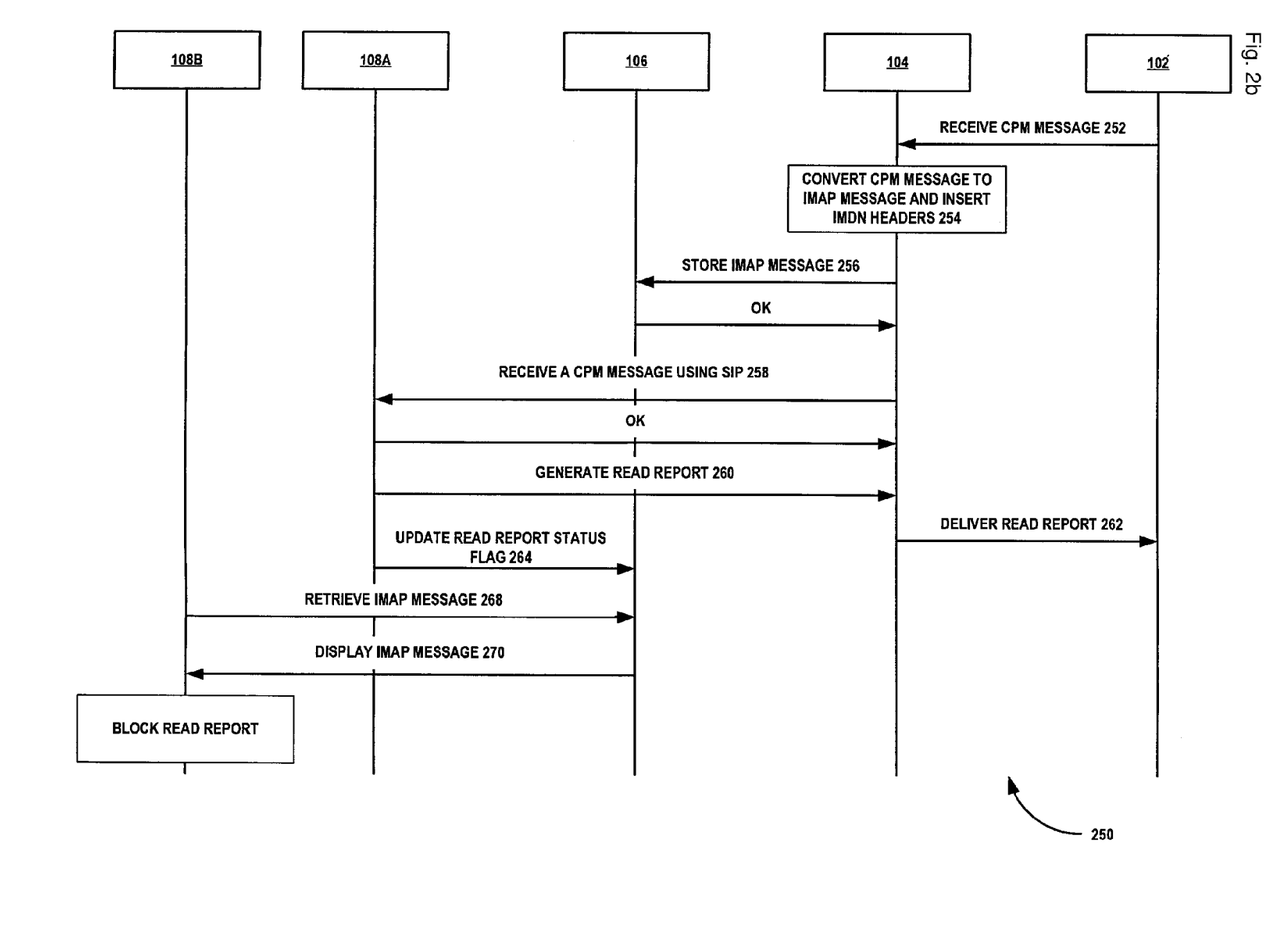
FIG. 2b is a flow diagram illustrating generation of a read report by a terminating CPM client device, according to another embodiment.

FIG. 2b is a flow diagram 250 illustrating generation of a read report by the terminating CPM client device 108A, according to another embodiment. At step 252, a CPM message is received from the originating CPM client device 102A by the CPM participating/controlling function server 104. At step 254, the CPM message is converted into an IMAP message and IMDN headers are inserted into the IMAP message. At step 256, the IMAP message is stored in the message storage server 106 by the CPM participating/controlling function server 104 using an IMAP. It can be noted that, the CPM participating/controlling function server 104 has stored the IMAP message in the message storage server 106 as per preference set by the user of the terminating CPM client devices 108A-N. It should be noted that, although the IMAP message is stored in the message storage server 106, one or more of the terminating client devices 108A-N may receive the CPM message from the CPM participating/controlling function server 104 directly and others may retrieve the IMAP message from the message storage server 106 using the IMAP based on the status (e.g., online, offline, etc.) of the terminating CPM client device 108A-N as described below.

At step 258, the CPM message is received by the terminating CPM client device 108A from the CPM participating/controlling server 104 using the SIP. At step 260, a read report is generated by the terminating CPM client device 108A in response to receiving the CPM message. Further, at step 260, the generated read report is sent to the CPM participating/controlling function server 104 by the terminating CPM client device 108A using the SIP. At step 262, the read report is delivered to the originating CPM client device 102A by the CPM participating/controlling function server 104 using the SIP. At step 264, the read report status flag is set to true by the terminating CPM client device 108A which is then updated in the message storage server 106. This helps prevent another terminating CPM client devices 108B-N to generate duplicate read reports during subsequent retrievals of the IMAP message as described in below steps.

At step 266, the IMAP message is retrieved from the message storage server 106 by the terminating CPM client device 108B using the IMAP. At step 268, the IMAP message is displayed on the terminating CPM client device 108B. Upon displaying, it is determined by the terminating CPM client device 108B whether the read report status flag in the IMDN headers is set to true or false. Since, the read report is already generated by the terminating CPM client device 108A and the read report status flag in the IMDN headers of the retrieved message is set to true ("\read-report-sent"), the terminating CPM client device 108B will not generate any duplicate read report based on the read report status flag, as in step 270.

Figure 3:
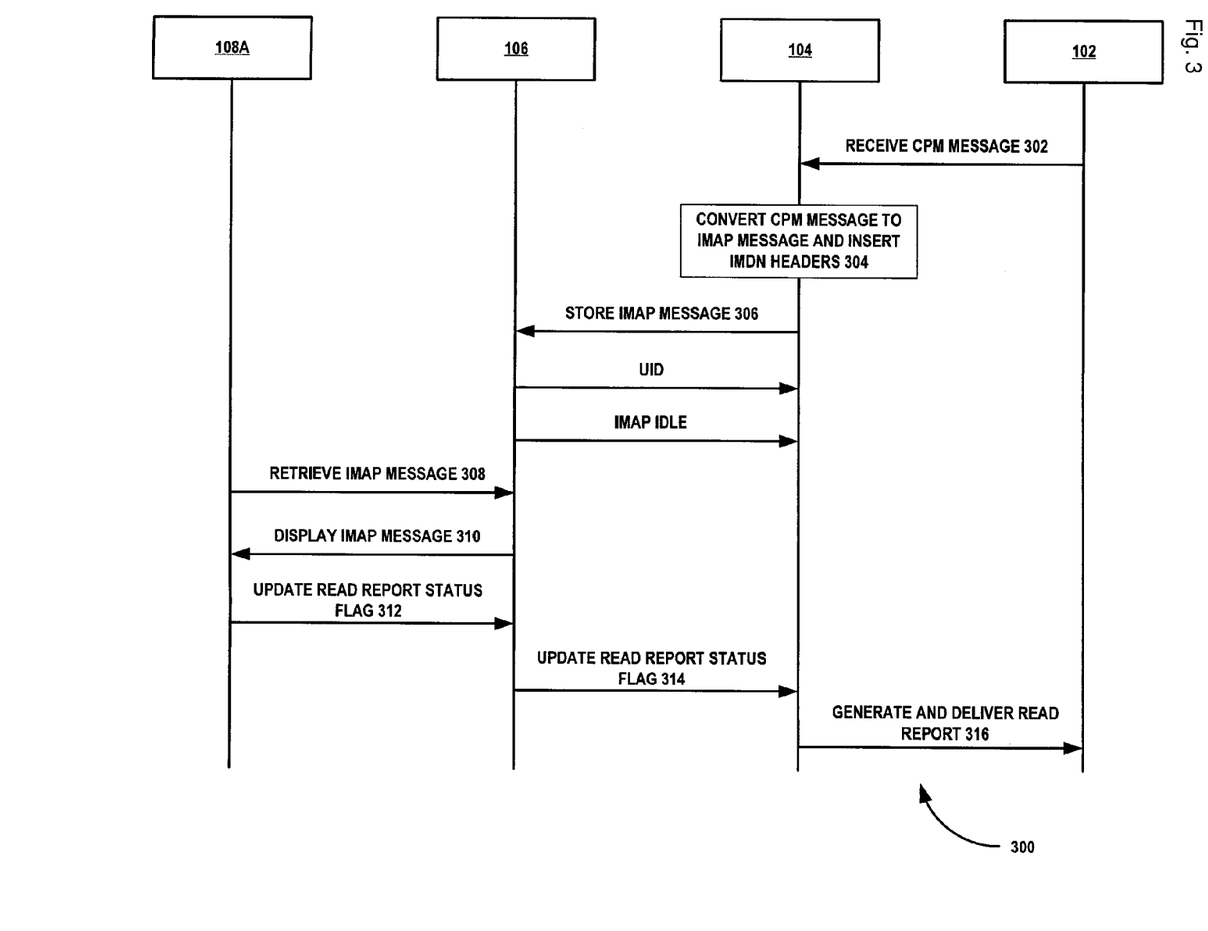
FIG. 3 is a flow diagram illustrating generation of a read report by a CPM participating/controlling function server, according to one embodiment.

FIG. 3 is a flow diagram 300 illustrating generation of a read report by the CPM participating/controlling function server 102A, according to one embodiment. At step 302, a CPM message is received from the originating CPM client device 102A by the CPM participating/controlling function server 104. At step 304, the CPM message is converted into an IMAP message and IMDN headers are removed from the IMAP message. At step 306, the IMAP message is stored in the message storage server 106 by the CPM participating/controlling function server 104. At step 308, the IMAP message is retrieved from the message storage server 106 by the terminating CPM client device 108A using the IMAP. At step 310, the CPM message is displayed on the terminating CPM client device 108A.

Upon displaying the IMAP message, the terminating CPM client device 108A determines whether a read report status update in the IMAP message is set to false. In such case, at step 312, the read report status flag is set to true by the terminating CPM client device 108A and forwards to the message storage server 106 using the IMAP. At step 314, the read report status flag is updated with the CPM participating/controlling function server 104 using the IMAP. In order to continuously receive updates from the message storage server 106, the CPM participating/controlling function server 104 maintains an active session with the message storage server 106 using the IMAP idle command. Alternatively, the CPM participating/controlling function server 104 can poll the message storage server 106 periodically to receive the updated read report status flag.

At step 316, a read report is generated by the CPM participating/controlling function server 104 and forwarded to the originating CPM client device 102A using the SIP. The read report generation by the CPM participating/controlling function server 104 eliminates the possibility of multiple read reports being generated during subsequent retrieval of the IMAP message by the one or more terminating CPM client devices 108A-N.

Figure 4:
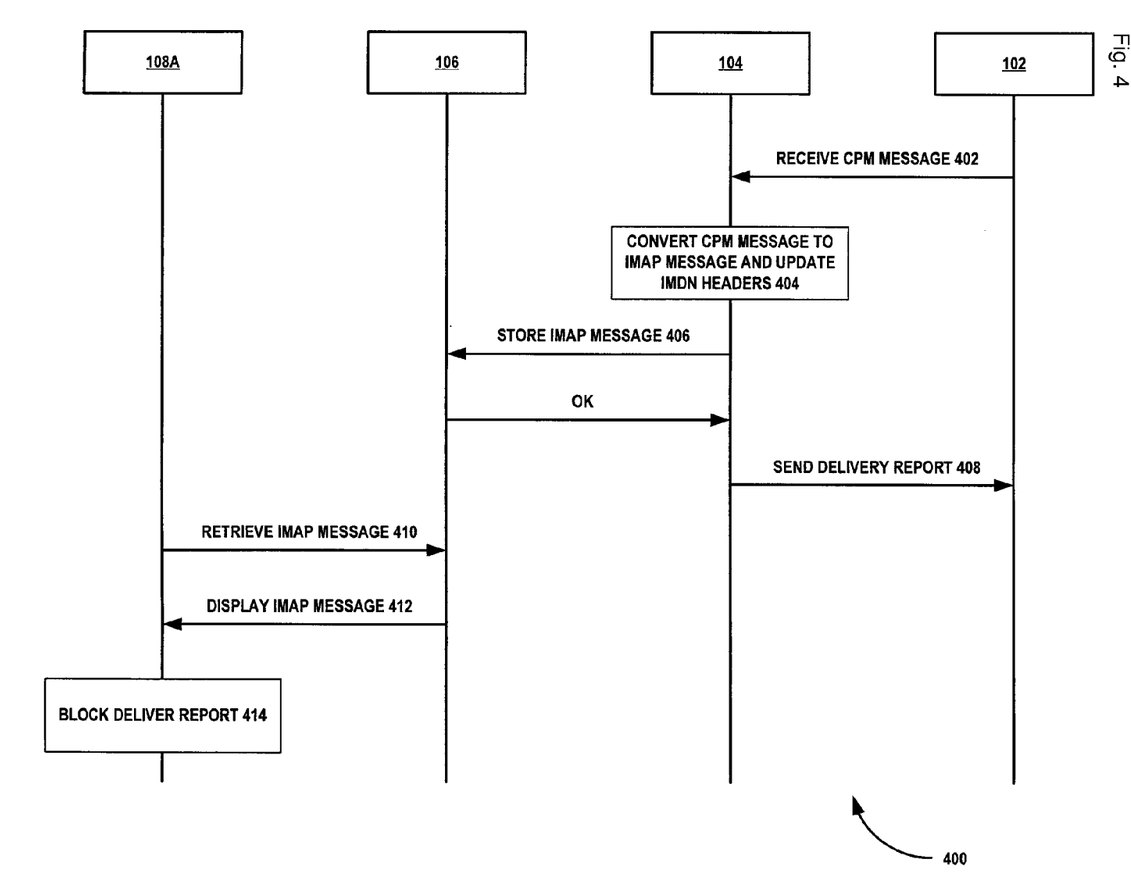
FIG. 4 is a flow diagram illustrating blocking of redundant delivery reports by the terminating CPM client device, according to one embodiment.

FIG. 4 is a flow diagram 400 illustrating blocking of redundant delivery reports by the terminating CPM client device 108A, according to one embodiment. At step 402, a CPM message is received from the originating CPM client device 102A by the CPM participating/controlling function server 104. At step 404, the CPM message is converted into an IMAP message and IMDN headers are inserted in the IMAP message. Also, at step 404, the delivery report status flag in the IMDN headers is updated to indicate that the delivery report is handled by the CPM participating/controlling function client device 104.

At step 406, the IMAP message is stored in the message storage server 106 by the CPM participating/controlling function server 104. At step 408, a delivery report is sent to the originating client device 102A by the CPM participating/controlling client device 104. At step 408, the IMAP message is retrieved from the message storage server 106 by the terminating CPM client device 108A using the IMAP. At step 410, the CPM message is displayed on the terminating CPM client device 108A. At step 412, a delivery report generated upon displaying the IMAP message is blocked based on the delivery status update flag in the IMDN headers.

Figure 5:
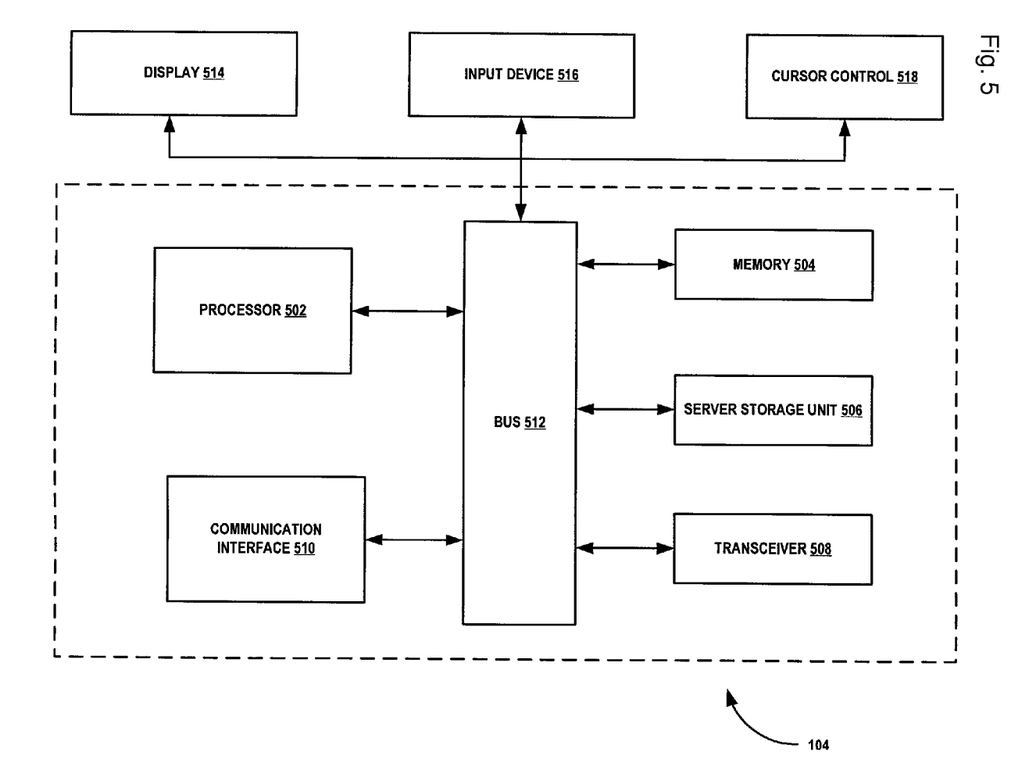
FIG. 5 is a block diagram of the CPM participating/controlling function server of FIG. 1 showing various components for implementing embodiments of the present subject matter.

FIG. 5 is a block diagram of the CPM participating/controlling function server 104 of FIG. 1 showing various components for implementing embodiments of the present subject matter. In FIG. 5, the CPM participating/controlling function server 104 includes a processor 502, memory 504, a server storage unit 506, a transceiver 508, a bus 510, a communication interface 512, a display 514, an input device 516, and a cursor control 518.

The processor 502, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 502 may also include embedded controllers, such as generic or programmable logic devices or arrays, application specific integrated circuits, single-chip computers, smart cards, and the like.

The memory 504 and the server storage unit 506 may include volatile memory and non-volatile memory. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 502. For example, a computer program may include machine-readable instructions capable of generating read and delivery reports in an IMAP domain, according to the teachings and herein described embodiments of the present subject matter. In one embodiment, the program may be included on a compact disk-read only memory (CD-ROM) and loaded from the CD-ROM to a hard drive in the non-volatile memory. The machine-readable instructions may cause the CPM participating/controlling function server 104 to encode according to the various embodiments of the present subject matter.

The transceiver 508 may be capable of transmitting IMAP messages and receiving CPM messages, flag updates, read reports and the like. The bus 510 acts as interconnect between various components of the CPM participating/controlling function server 104. The components such as communication interfaces 512, the display 514, the input device 516, and the cursor control 518 are well known to the person skilled in the art and hence the explanation is thereof omitted.

Figure 6:
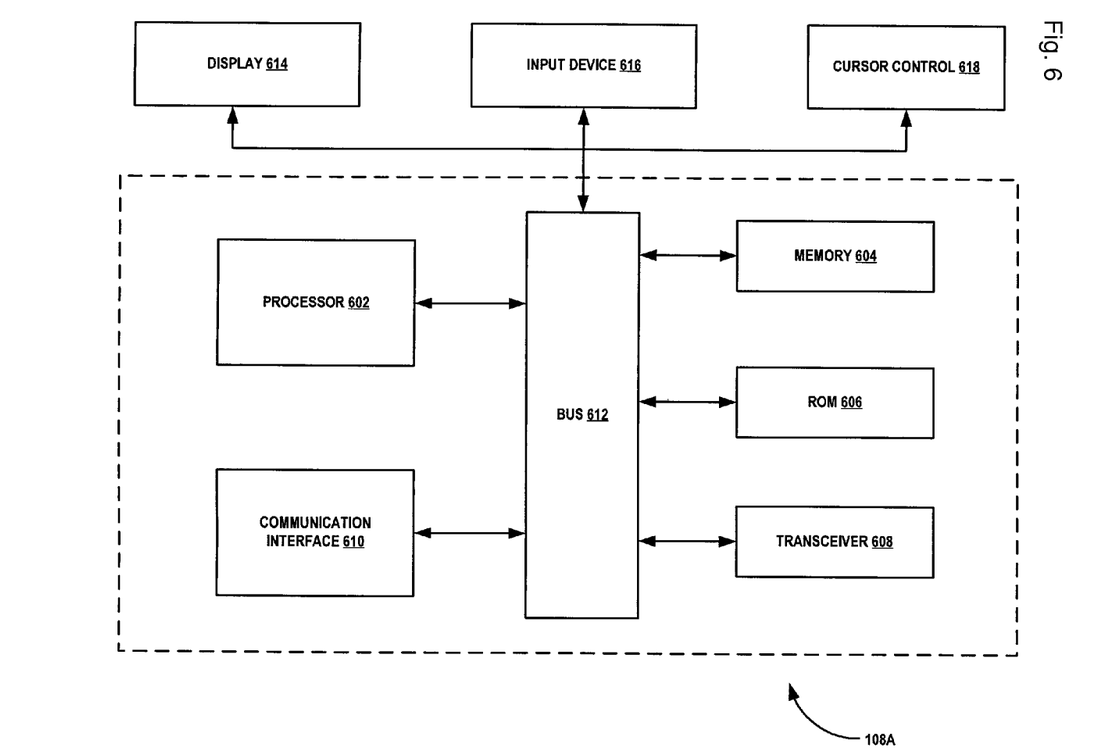
FIG. 6 is a block diagram of the terminating CPM client device of FIG. 1 showing various components for implementing embodiments of the present subject matter.

FIG. 6 is a block diagram of the terminating CPM client device 108A of FIG. 1 showing various components for implementing embodiments of the present subject matter. In FIG. 6, the terminating CPM client device 108A includes a processor 602, memory 604, a Read Only Memory (ROM)

606, a transceiver 608, a bus 610, a communication interface 612, a display 614, an input device 616, and a cursor control 618.

The processor 602, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 602 may also include embedded controllers, such as generic or programmable logic devices or arrays, application specific integrated circuits, single-chip computers, smart cards, and the like.

The memory 604 may include volatile memory and non-volatile memory. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 602. For example, a program may include machine-readable instructions capable of generating read and delivery reports in an IMAP domain, according to the teachings and herein described embodiments of the present subject matter. In one embodiment, the program may be included on a compact disk-read only memory (CD-ROM) and loaded from the CD-ROM to a hard drive in the non-volatile memory. The machine-readable instructions may cause the terminating CPM client device 108A to encode according to the various embodiments of the present subject matter.

The transceiver 608 may be capable of receiving and transmitting IMAP and CPM messages, read and update flag associated with messages on the message storage server 106, generate read reports and the like. The bus 610 acts as interconnect between various components of the terminating CPM client device 108A. The components such as the ROM 606, the communication interfaces 612, the display 614, the input device 616, and the cursor control 618 are well known to the person skilled in the art and hence the explanation is thereof omitted.

Figure 7:
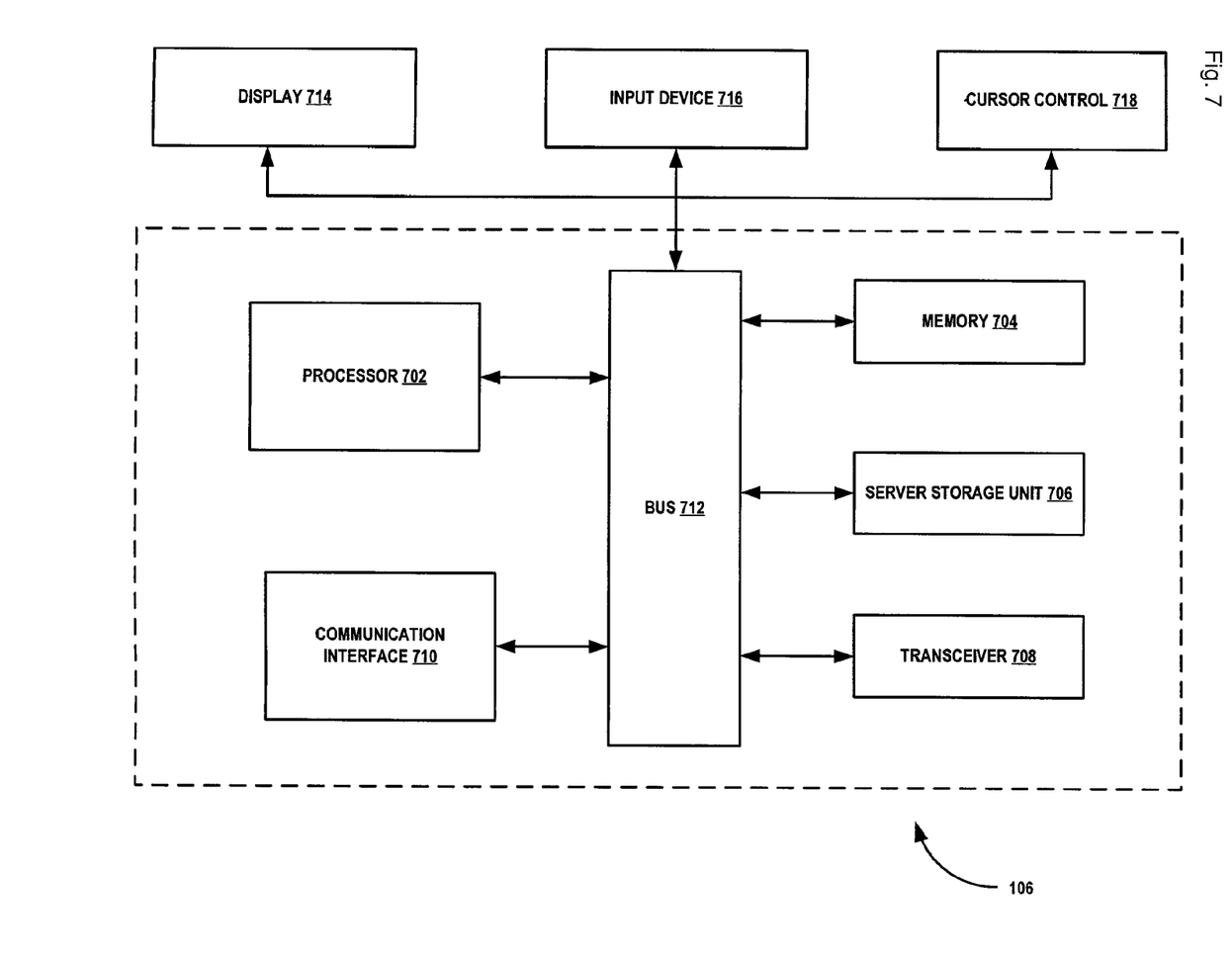
FIG. 7 is a block diagram of the message storage server of FIG. 1 showing various components for implementing embodiments of the present subject matter.

FIG. 7 is a block diagram of the message storage server 106 of FIG. 1 showing various components for implementing embodiments of the present subject matter. In FIG. 7, the message storage server 106 includes a processor 702, memory 704, a server storage unit 706, a transceiver 708, a bus 710, a communication interface 712, a display 714, an input device 716, and a cursor control 718.

The processor 702, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 702 may also include embedded controllers, such as generic or programmable logic devices or arrays, application specific integrated circuits, single-chip computers, smart cards, and the like.

The memory 704 and the server storage unit 706 may include volatile memory and non-volatile memory. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 702. For example, a program may include machine-readable instructions capable of updating read report flag status in the IMDN headers of the IMAP message stored in the server storage unit 706, according to the teachings and herein described embodiments of the present subject matter. In one embodiment, the program may be included on a compact disk-read only memory (CD-ROM) and loaded from the CD-ROM to a hard drive in the non-volatile memory. The machine-readable instructions may cause the message storage server 106 to encode according to the various embodiments of the present subject matter.

The transceiver 708 may be capable of delivering IMAP messages to the terminating CPM client devices 108A-N, receiving and transmitting updated read report status flag associated with messages stored in the server storage unit 706, and the like. The bus 710 acts as interconnect between various components of the message storage server 106. The components such as the communication interfaces 712, the display 714, the input device 716, and the cursor control 718 are well known to the person skilled in the art and hence the explanation is thereof omitted.

It will be appreciated that the various embodiments discussed herein may not be the same embodiment, and may be grouped into various other embodiments not explicitly disclosed herein. In addition, it will be appreciated that the various operations, processes, and methods disclosed herein may be embodied in a machine-readable medium and/or a machine accessible medium compatible with a data processing system, and may be performed in any order (e.g., including using means for achieving the various operations). Accordingly, the specification and drawings are to be regarded in an illustrative rather than a restrictive sense.

The invention claimed is:

1. A method for handling a read confirmation for a converged internet protocol messaging (CPM) message, the method performed by a terminal, the method comprising:
   receiving a CPM message from an originating CPM client device via a first server;
   determining whether the received CPM message contains a request for display notification;
   determining whether a message corresponding to the CPM message is stored in a second server, if the CPM message contains the request for display notification;
   checking if a read report status flag attribute is set to false;
   constructing a read report in response to the read confirmation based on determining that the read report status flag is set to false; and sending a request to the second server for setting the read report status flag attribute to true.

2. The method of claim 1, wherein the terminal is interfaced with the second server via an internet message access protocol (IMAP).

3. The method of claim 1, wherein the first server is a CPM participating/controlling function server and the second server is a message storage server.

4. The method of claim 1, further comprising:
blocking construction of the read report if the read report status flag attribute is true.

5. The method of claim 2, wherein the read report status flag attribute is a CMP-defined IMAP flag extension associated with the message stored in the second server.

6. A terminal for handling a read confirmation for a converged internet protocol messaging (CPM) message, the terminal comprising:
an interface unit configured to receive a CPM message from a transmitting terminal via a first server;
a processor configured to:
determine whether the received CPM message contains a request for display notification;
determine whether a message corresponding to the CPM message is stored in a second server, if the CPM message contains the request for display notification;
check if a read report status flag attribute in the stored message is set to false;
construct a read report in response to the read confirmation based on determining that the read report status flag is set to false; and
control to send a request to the second server for setting the read report status flag attribute to true.

7. The terminal of claim 6, wherein the interface unit is further configured to be interfaced with the second server via an internet message access protocol (IMAP).

8. The terminal of claim 6, wherein the first server is a CPM participating/controlling function server and the second server is a message storage server.

9. The terminal of claim 6, wherein the processor is further configured to:
block construction of the read report if the read report status flag attribute is true.

10. The terminal of claim 7, wherein the read report status flag attribute is a CPM-defined IMAP flag extension associated with the message stored in the second server.

11. A method for handling a read confirmation for a converged internet protocol messaging (CPM) message, the method performed by a terminal, the method comprising:
generating a CPM message including a request for display notification;
sending the CPM message to a receiving terminal via a first server; and
receiving a read report in response to the read confirmation from the receiving terminal via the first server,
wherein the read report is constructed at the receiving terminal if a message corresponding to the CPM message is stored in a second server and a read report status flag attribute is set to false.

12. The method of claim 11, wherein the terminal is interfaced with the second server via an internet message access protocol (IMAP).

13. The method of claim 11, wherein the first server is a CPM participating/controlling function server and the second server is a message storage server.

14. The method of claim 11, wherein the read report is not sent to the terminal if the read report status flag attribute is true.

15. The method of claim 12, wherein the read report status flag attribute is a CPM-defined IMAP flag extension associated with the message stored in the second server.

16. A terminal for handling a read confirmation for a CPM message, the terminal comprising:
a processor configured to generate a CPM message including a request for display notification; and
an interface unit configured to send a CPM message to a receiving terminal via a first server and receive a read report in response to the read confirmation from the receiving terminal via the first server,
wherein the read report is constructed at the receiving terminal if a message corresponding to the CPM message is stored in a second server and a read report status flag attribute is set to false.

17. The terminal of claim 16, wherein the interface unit is further configured to be interfaced with the second server via an internet message access protocol (IMAP).

18. The terminal of claim 16, wherein the first server is a CPM participating/controlling function server and the second server is a message storage server.

19. The terminal of claim 16 wherein the read report is not sent to the terminal if the read report status flag attribute is true.

20. The terminal of claim 17, wherein the read report status flag attribute is a CPM-defined IMAP flag extension associated with the message stored in the second server.

* * * * *